Figure 1:
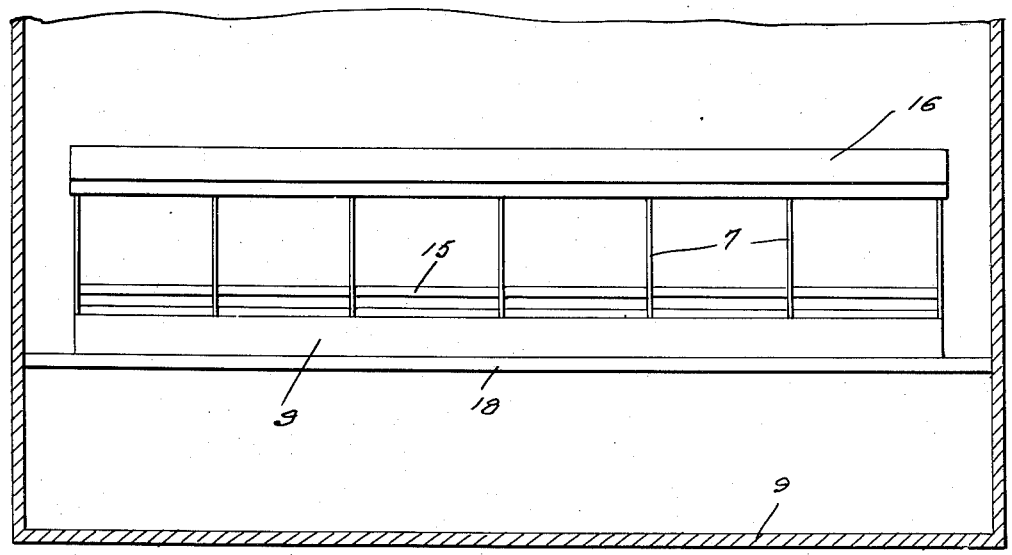

Oct. 20, 1931.  A. GRILL  1,828,406
EGG SAVER TRAP
Filed June 28, 1929  2 Sheets-Sheet 1

Inventor
Albert Grill
By Clarence A. O'Brien
Attorney

Oct. 20, 1931.　　A. GRILL　　1,828,406
EGG SAVER TRAP
Filed June 28, 1929　　2 Sheets-Sheet 2

Inventor
Albert Grill

By Clarence A. O'Brien
Attorney

Patented Oct. 20, 1931

1,828,406

UNITED STATES PATENT OFFICE

ALBERT GRILL, OF WATKINS, MINNESOTA

EGG SAVER TRAP

Application filed June 28, 1929. Serial No. 374,425.

The present invention relates to an egg saver trap and has for its prime object to provide a nest into which hens may lay eggs and when the eggs drop they will roll to a position out of the reach of the hens thereby preventing the hens and others from eating the eggs or otherwise destroying or tampering with the same.

Another very important object of the invention resides in the provision of an egg saver trap of this nature which is constructed with means whereby an attendant may easily remove the eggs therefrom.

A still further very important object of the invention resides in the provision of an apparatus of this nature which is exceedingly simple in its construction, inexpensive to manufacture, strong and durable, compact and convenient in its arrangement of parts, and thoroughly efficient and reliable in use.

With the above and numerous other objects in view as will appear as the description proceeds, the invention resides in certain novel features of construction, and in the combination and arrangement of parts as will be hereinafter more fully described and claimed.

Figure 4:
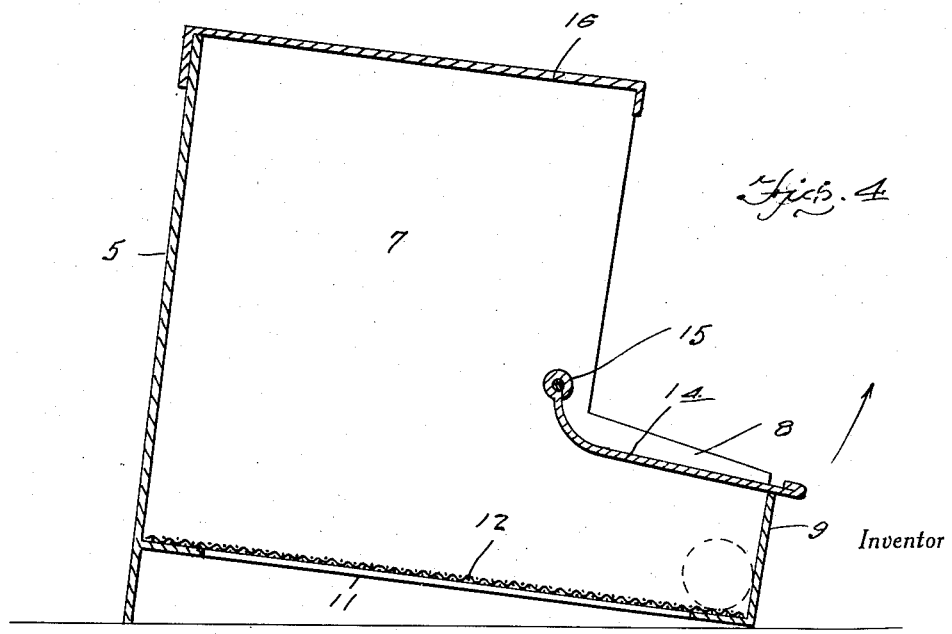
Figure 2:
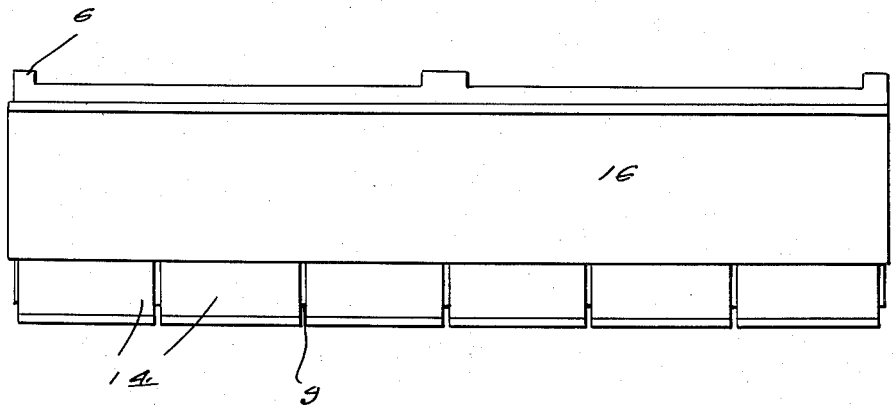
Figure 3:
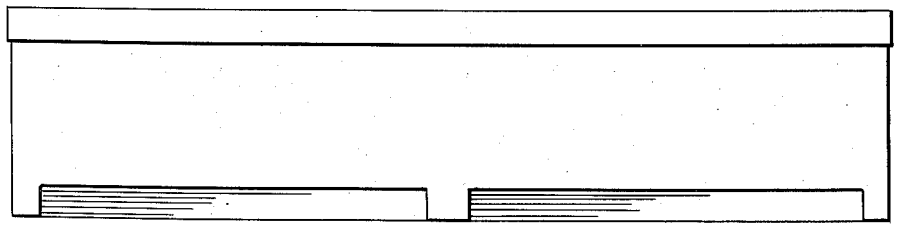
Figure 5:
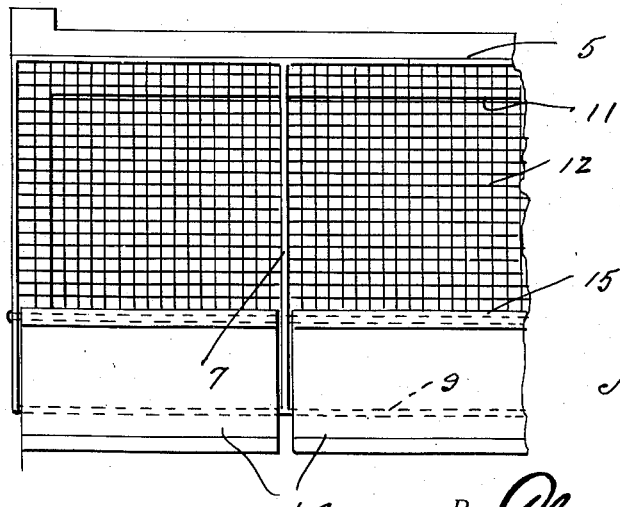

In the drawings:

Figure 1 is a front elevation of the apparatus embodying the features of my invention showing the same in a chicken house the latter being shown in section, Figure 2 is a top plan view of the apparatus, Figure 3 is a rear elevation, Figure 4 is a vertical transverse section therethrough, and Figure 5 is a top plan view with the top or roof removed.

Referring to the drawings in detail it will be seen that the apparatus comprises an elongated housing having an open bottom and which is formed with a rear wall 5 having extensions at its lower edge forming legs 6. This rear wall 5 inclines upwardly and forwardly. A plurality of partitions and side walls 7 project forwardly at right angles from the rear wall 5 and are formed on the lower portions of their front edges with extensions 8. Across the front edges of the extensions 8 is the front wall 9.

The rear wall 5, the two side walls and the front wall 9 are formed with inwardly directed flanges 11 adjacent their lower edges for supporting foraminous bottom 12. A plurality of lids 14 are pivotally mounted as at 15 between the partitions and walls 7 to normally rest on the upper edge of the wall 9 and close the trap compartment formed between the extensions 8.

A top 16 is mounted on the upper edges of the wall 5 and the walls and partitions 7 and may be readily removed when it is desired to clean the apparatus.

From the above detailed description it will be readily appreciated that this apparatus may be mounted on a shelf 18 or the like in a chicken house 19 and when so mounted the bottom 12 inclines downwardly and forwardly while the walls 5 and 9 are in parallelism with each other and incline upwardly and forwardly.

Therefore when a hen lays an egg in various compartments, said egg will roll down into the trap formed between the extensions 8 and the attendant may readily remove the eggs by lifting the lid 14.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An apparatus of the character described comprising an elongated housing having an open bottom and including an upwardly and forwardly inclined rear wall, an integral, forwardly projecting flange on said rear wall in spaced relation to the lower edge thereof, spaced, parallel, opposed partition walls extending forwardly and downwardly from the rear wall and connected thereto above the flange, integral extensions projecting forwardly and downwardly from the lower portions of the partition walls, an inclined front wall secured to the free ends of the extensions and terminating below the upper edges thereof, an integral inturned flange on the front wall extending beneath the extensions, foraminous bottoms removably disposed on the flanges between the partition walls, a horizontally disposed rod extending transversely through the forward portions of the partition walls above the horizontal plane of the extensions, a plurality of lids disposed between the extensions and having upwardly curved inner end portions disposed between the partition walls and hingedly connected to the rod, the opposite end portions of the lids engageable for rest on the upper edge of the front wall and projecting therebeyond, and a removable top on the apparatus.

In testimony whereof I affix my signature.

ALBERT GRILL.